United States Patent
Härlen et al.

(10) Patent No.: US 10,203,147 B2
(45) Date of Patent: Feb. 12, 2019

(54) REFRIGERATION DEVICE HAVING AUTOMATIC DEFROSTING AND METHOD FOR OPERATING A REFRIGERATION DEVICE OF THIS TYPE

(71) Applicant: BSH BOSCH UND SIEMENS HAUSGERÄTE GmbH, München (DE)

(72) Inventors: Jochen Härlen, Königsbronn (DE); Birtan Sert, Tekirdag (TR); Alex Sperling, Augsburg (DE); Nikolaus Ziegler, Bopfingen (DE)

(73) Assignee: BSH Hausgeräte GmbH, Munich (DE)

( * ) Notice: Subject to any disclaimer, the term of this patent is extended or adjusted under 35 U.S.C. 154(b) by 82 days.

(21) Appl. No.: 14/419,129

(22) PCT Filed: Jul. 18, 2013

(86) PCT No.: PCT/EP2013/065140
§ 371 (c)(1),
(2) Date: Feb. 2, 2015

(87) PCT Pub. No.: WO2014/019859
PCT Pub. Date: Feb. 6, 2014

(65) Prior Publication Data
US 2015/0219385 A1 Aug. 6, 2015

(30) Foreign Application Priority Data
Aug. 2, 2012 (DE) .................. 10 2012 213 644

(51) Int. Cl.
F25D 21/08 (2006.01)
F25D 21/00 (2006.01)

(52) U.S. Cl.
CPC ........... *F25D 21/08* (2013.01); *F25D 21/006* (2013.01); *F25B 2600/112* (2013.01);
(Continued)

(58) Field of Classification Search
CPC .................. F25D 21/006; F25D 21/08; F25B 2600/2519; F25B 2600/112; Y02B 40/32; Y02B 30/743
(Continued)

(56) References Cited

U.S. PATENT DOCUMENTS 2,554,848 A * 5/1951 Warren .................. F25B 47/022
137/495
2,630,685 A * 3/1953 Lewis .................... F25B 47/022
62/275
(Continued)

FOREIGN PATENT DOCUMENTS

CN 1123398 A 5/1996
EP 0 692 687 1/1996
(Continued)

OTHER PUBLICATIONS

International Search Report for PCT/EP2013/065140, dated May 14, 2014, 2 pages.
(Continued)

*Primary Examiner* — Ljiljana Ciric
*Assistant Examiner* — Kirstin Oswald
(74) *Attorney, Agent, or Firm* — Nixon & Vanderhye P.C.

(57) ABSTRACT

The invention relates to a refrigeration device, in particular a domestic refrigeration device, comprising a refrigerant circuit. The refrigerant circuit has a compressor, an evaporator, and a shut-off valve between an outlet of the compressor and an inlet of the evaporator. The refrigeration device also comprises a heater for defrosting the evaporator and a control unit that is designed to prepare for defrosting of the evaporator by operating the compressor with the shut-off valve closed.

19 Claims, 2 Drawing Sheets

(52) U.S. Cl.
CPC ..... *F25B 2600/2519* (2013.01); *Y02B 30/743* (2013.01); *Y02B 40/32* (2013.01)

(58) Field of Classification Search
USPC ................. 62/80, 81, 151, 155, 275, 276
See application file for complete search history.

(56) References Cited

U.S. PATENT DOCUMENTS

| | | | | | |
|---|---|---|---|---|---|
| 2,688,850 | A | * | 9/1954 | White | F25B 47/022 62/234 |
| 3,899,896 | A | * | 8/1975 | Bryant | F25D 17/065 62/155 |
| 3,918,268 | A | * | 11/1975 | Nussbaum | F25B 47/006 62/150 |
| 3,992,895 | A | * | 11/1976 | Kramer | F25B 47/022 62/155 |
| 4,122,687 | A | * | 10/1978 | McKee | F25D 21/12 62/156 |
| 4,216,658 | A | * | 8/1980 | Baker, III | F24F 5/0017 62/99 |
| 4,531,376 | A | * | 7/1985 | Alsenz | F25D 21/006 62/140 |
| 5,156,010 | A | * | 10/1992 | Inoue | F25B 47/025 62/81 |
| 5,231,844 | A | * | 8/1993 | Park | F25D 21/002 62/153 |
| 5,231,884 | A | * | 8/1993 | Zolock | G01F 1/8413 324/601 |
| 5,611,982 | A | * | 3/1997 | Mathavan | B32B 27/32 264/131 |
| 5,630,323 | A | * | 5/1997 | Niijima | F25B 41/04 62/158 |
| 5,842,335 | A | * | 12/1998 | Esau | A01F 15/10 56/341 |
| 5,842,355 | A | * | 12/1998 | Kalis | F25D 17/062 62/234 |
| 6,619,058 | B2 | * | 9/2003 | Cho | F25D 11/022 62/155 |
| 6,772,597 | B1 | * | 8/2004 | Zentner | F25D 21/006 62/153 |
| 8,511,102 | B2 | * | 8/2013 | Feng | F25D 21/006 62/151 |
| 2002/0184900 | A1 | * | 12/2002 | Wellman | A47F 3/0443 62/155 |
| 2004/0107727 | A1 | * | 6/2004 | Kim | F25B 5/04 62/525 |
| 2005/0066667 | A1 | * | 3/2005 | Strauss | F25D 21/008 62/80 |
| 2006/0254308 | A1 | * | 11/2006 | Yokoyama | B60H 1/3205 62/500 |

FOREIGN PATENT DOCUMENTS

| | | |
|---|---|---|
| JP | 2001-183036 | 7/2001 |
| SU | 546764 | 4/1977 |
| SU | 892143 | 12/1981 |
| WO | 2003/098134 | 11/2003 |

OTHER PUBLICATIONS

Foreign-language Written Opinion of the ISA for PCT/EP2013/065140, dated May 14, 2014, 5 pages.

* cited by examiner

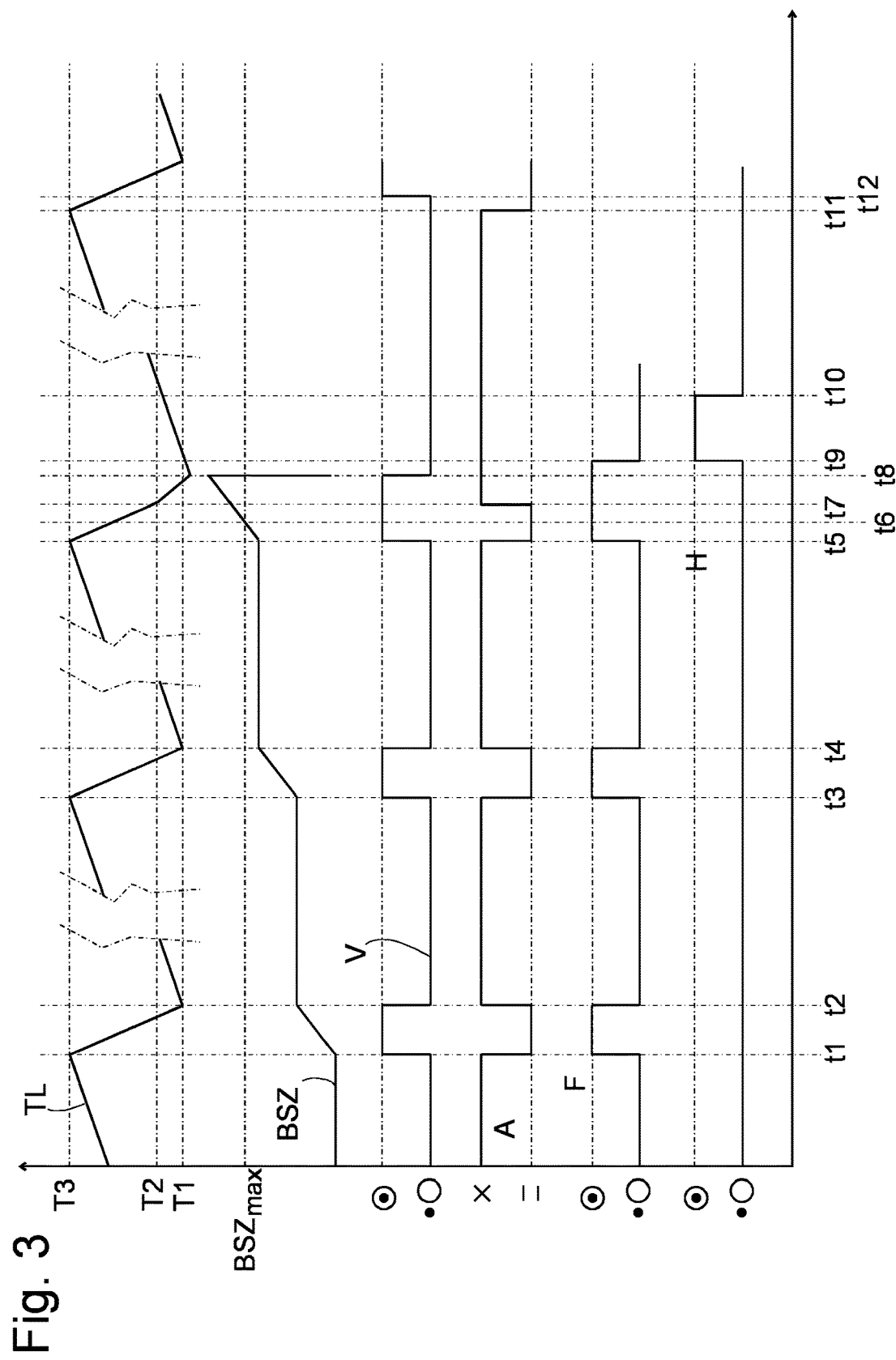

REFRIGERATION DEVICE HAVING AUTOMATIC DEFROSTING AND METHOD FOR OPERATING A REFRIGERATION DEVICE OF THIS TYPE

This application is the U.S. national phase of International Application No. PCT/EP2013/065140, filed 18 Jul. 2013, which designated the U.S. and claims priority to DE Patent Application No. 10 2012 213 644.4, filed 2 Aug. 2012, the entire contents of each of which are hereby incorporated by reference.

The present invention relates to a refrigeration device, in particular a domestic refrigeration device having an automatically defrosting evaporator.

During operation of a refrigeration device, moisture condenses on the evaporator and can grow into a thermally insulating frost layer. A layer of this type significantly impairs the energy efficiency of the refrigeration device. It has therefore long been known to equip the evaporator of a refrigeration device with a heater which is operated from time to time to thaw the frost layer. A control system for this defrosting heater is often coupled to an operating time counter in order to defrost the evaporator after a fixed number of operating hours of the compressor. The condition for defrosting can therefore only come about while the compressor is running, with the consequence that automatic defrosting normally follows directly after an operating phase of the evaporator.

At this time point, the evaporator contains a considerable quantity of liquid refrigerant which must also be heated during defrosting. In this process, the refrigerant largely changes to the vapor state. A large amount of energy which has previously been used to liquefy the refrigerant is thereby wasted unused. Instead, a significant amount of heat energy is needed in order to evaporate the refrigerant. Due to the time required to introduce this heat energy, the defrosting process is uselessly prolonged.

Although such an ineffective use of energy could be prevented by waiting for a period between the switching off of the compressor and the switching on of the defrosting heater, during which the liquid refrigerant can evaporate while absorbing heat from a refrigerating compartment of the refrigeration device, the problem arises that simultaneously with the evaporation of the liquid refrigerant, the refrigerating compartment also warms up again. Consequently, the longer the waiting time between switching off the compressor and switching on the defrosting heater, the smaller is the residual quantity of liquid refrigerant that must be evaporated during the defrosting, but the greater also is the probability that the de-frosting process is not yet complete at a time point when the refrigerating compartment again has a cooling requirement and consequently the defrosting must either be interrupted prematurely or unwanted heating of the refrigerating compartment must be accepted.

Refrigeration devices whose refrigerant circuit comprises a shut-off valve between an outlet of the compressor and an inlet of the evaporator are per se known. A shut-off valve of this type conventionally serves to sustain a pressure difference built up during the compressor operation between the compressor output and the evaporator during a standstill phase of the compressor.

It is a general object of the present invention to improve the energy efficiency of a refrigeration device. In particular, it is an object therein to prevent efficiency losses due to unnecessary heating of refrigerant during defrosting of the evaporator.

The object is achieved in that in a refrigeration device, in particular a domestic refrigeration device having a refrigerant circuit which comprises a compressor, an evaporator and a shut-off valve between an outlet of the compressor and an inlet of the evaporator, a heater for defrosting the evaporator and a control unit, the control unit is configured to prepare for defrosting of the evaporator by operating the compressor with the shut-off valve closed. When the compressor operates with the shut-off valve closed, it creates a negative pressure in the evaporator which favors the evaporation of liquid refrigerant contained therein. Since the vapor produced during the evaporation is drawn away by the compressor, after a sufficient running time of the compressor, only a very small residual quantity of refrigerant is contained in the evaporator. Therefore, at most only a small fraction of the power of the heater must be used to heat the refrigerant and a larger proportion of the heating power is available for thawing the frost layer. Since the time required for defrosting is shortened, the heat input into a storage compartment of the refrigeration device caused by the defrosting is also reduced, which additionally enhances the efficiency.

The running time of the compressor between closing the shut-off valve and switching on the heater should be long enough in order to reduce significantly the quantity of refrigerant in the evaporator. In general, the running time should therefore not be less than 2 minutes.

Alternatively, a minimum running time of the compressor between the closing of the shut-off valve and the switching on of the heater can also be derived from the consideration that the volume conveyed by the compressor should be sufficient to extract a substantial part of the refrigerant which is contained in the evaporator when the shut-off valve is closed. Thus, for example, the vapor pressure of the butane commonly-used as a refrigerant at typical temperatures of the evaporator is approximately 0.5 bar and the ratio of the densities in the gaseous to the liquid state is approximately 1:400. If the evaporator were completely filled with liquid refrigerant when the shut-off valve closes, then as a result (provided the pressure does not fall below 0.5 bar), a volume conveyed by the compressor corresponding to 400 times that of the evaporator volume would be sufficient to pump out enough refrigerant such that only gaseous refrigerant remains in the evaporator. Since the evaporator is always only fractionally filled with liquid refrigerant, a conveyed volume of at least 50 times, or better still, at least 100 times the evaporator volume should be sufficient to extract, if not all, then at least the majority of the liquid refrigerant contained therein and thus significantly to reduce the heat capacity of the evaporator.

When the heater is in operation, the shut-off valve should be kept closed so that the evaporator is not cooled by the inflow and expansion therein of refrigerant.

Between the switching off of the heater and a subsequent switching on of the compressor, it may be suitable to open the shut-off valve in order to reduce the pressure difference between the inlet and the outlet of the compressor and so to facilitate the starting up of the compressor.

In general, it is preferred for the refrigeration device according to the invention to use a rotation speed-regulated compressor, since these are capable of starting up against a substantial pressure gradient between the inlet and the outlet. If the compressor is designed to start against a pressure difference which exists between the high pressure region and the low pressure region of the refrigerant circuit existing following a phase of standstill of the compressor during which the heater has not been operated, opening of the shut-off valve be dispensed with t least following such a standstill phase.

Since the pressure difference between the high pressure region and the low pressure region following defrosting will, in general, be still greater than after a normal standstill phase of the compressor without defrosting, it can also be useful when using a compressor which can start against the pressure difference following a normal standstill phase, to reduce the pressure difference after a defrosting operation before starting the compressor and, for this purpose, to open the shut-off valve, at least for a short time before starting the compressor.

It is per se known to connect the control unit of a refrigeration device to a temperature sensor so that the control unit can switch the compressor off if the temperature undershoots a first limit value. If, immediately before defrosting, the control unit closes the shut-off valve when this limit value is undershot but continues operating the compressor in order to draw the liquid refrigerant out of the evaporator, then this leads to a more severe cooling of the evaporator than during normal operation. Such a low temperature has, in general, no advantages for the storage life of the refrigerated goods in the refrigeration device. The low vapor pressure of the refrigerant accompanied by the low evaporator temperature makes long operation of the compressor necessary in order to clear the refrigerant out of the evaporator. It is therefore more suitable that the control unit closes the shut-off valve before a defrosting of the compressor if a second limit value of the temperature which lies higher than the first limit value is undershot. The difference between the limit values can suitably be selected such that by operation of the compressor after closing of the shut-off valve, the first limit value of the temperature is at least approximately reached.

Heatable evaporators are commonly used, in particular, in no-frost refrigeration devices wherein the evaporator is accommodated in an evaporator chamber separate from a storage chamber of the refrigeration device and a fan circulates air between the storage chamber and the evaporator chamber in order to cool the storage chamber. A fan of this type should suitably also be in operation when the compressor is in operation with the shut-off valve closed, so that the cooling of the storage chamber generated during the drawing off of the refrigerant can still be useful.

The fan can also be in operation in a time period between the switching off of the compressor and the subsequent switching on of the heater, in order to convey as much heat as possible from the storage chamber to the evaporator chamber before the heater is put into operation.

The object is further achieved by a method for operating a refrigeration device which comprises a refrigerant circuit with a compressor, an evaporator and a shut-off valve between an outlet of the compressor and an inlet of the evaporator, having the steps:
 Operation of the compressor with the shut-off valve closed;
 Switching off of the compressor; and
 Heating of the evaporator Further features and advantages of the invention are disclosed in the following description of exemplary embodiments, making reference to the accompanying drawings. The description and the figures also disclose features of the exemplary embodiments which are not mentioned in the claims. Such features can also appear in other combinations than those specifically disclosed herein. The fact that several such features are mentioned in one sentence or in another type of textual association with one another therefore does not justify the conclusion that they can only appear in the specifically disclosed combination; rather, it should be fundamentally assumed that of a plurality of such features, individual features can be omitted or varied, provided this does not call into question the functional viability of the invention. In the drawings:

FIG. 3 is the chronological development of various operating variables of the refrigeration device.

Figure 1:
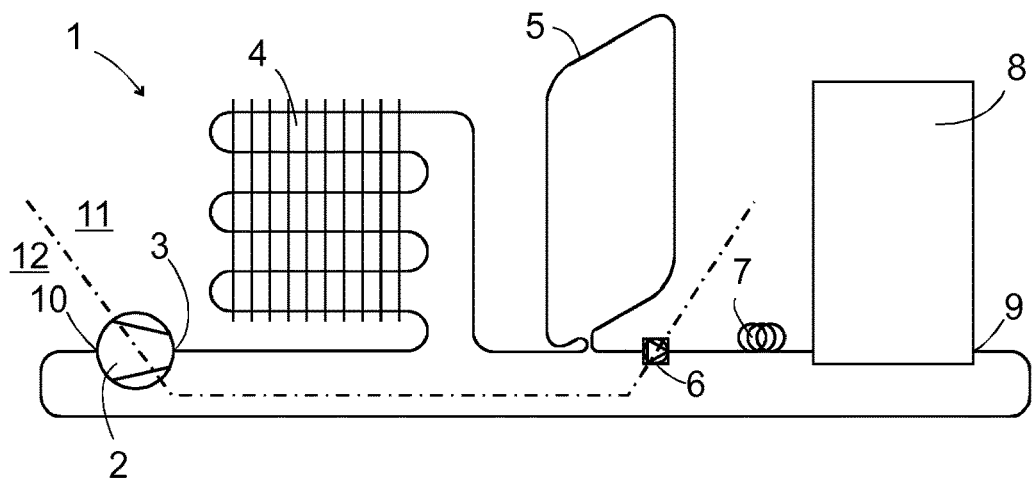
FIG. 1 is a block diagram of the refrigerant circuit of a refrigeration device according to the invention.

FIG. 1 shows in schematic form a refrigerant circuit 1 of a domestic refrigeration device according to the invention. A compressor 2 has an outlet 3 to which a liquefier 4, a frame heater 5, a shut-off valve 6, a capillary 7 and an evaporator 8 are connected. An outlet 9 of the evaporator 8 is connected to an inlet 10 of the compressor 2. The whole refrigerant circuit 1 can be subdivided into a high pressure region 11 which extends, during normal operation of the compressor 2 from the outlet 3 thereof to the capillary 7 and, when the compressor 2 is switched off and the shut-off valve 6 is closed, extends to the latter, and a low pressure region 12 which extends from the capillary 7 or the shut-off valve 6 to the inlet 10 of the compressor 2.

Figure 2:
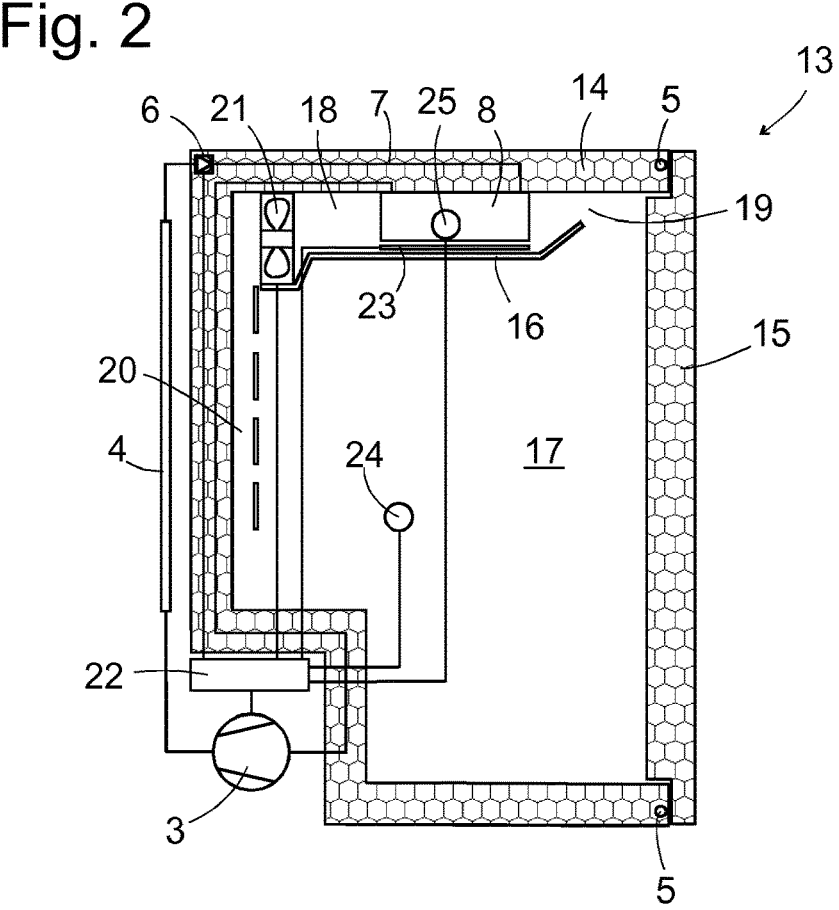
FIG. 2 is a schematic cross-section through a refrigeration device according to the invention.

FIG. 2 shows a refrigeration device 13 equipped with the refrigerant circuit 1 shown in a schematic cross-section. What is shown is a device in a no-frost construction, i.e. an inner chamber of a heat-insulated housing formed by a body 14 and a door 15 hinged thereon is subdivided by an intermediate wall 16 into a storage chamber 17 for refrigerated goods and an evaporator chamber 18, which receives the evaporator 8. The evaporator chamber 18 communicates with the storage chamber 17 by means of an inlet opening 19 on its side facing toward the door 15 and a distribution channel 20 extending at a rear wall of the body 14. A fan 21 is provided to drive the air exchange between the chambers 17, 18. An electronic control unit 22 controls the operation of the fan 21, the compressor 2 and an electric heater 23 mounted on the evaporator 8, with the aid of an internal timer and by temperature sensors 24, 25 arranged at the storage chamber 17 or at the evaporator 8.

The mode of operation of the control unit 22 is described by reference to the graph of FIG. 3. A line TL shows the course of the temperature of the storage chamber 17 detected by the temperature sensor 24 over time t. Initially, this temperature rises slowly until it reaches a switching-on threshold T3 at time t1. This leads, as shown in a line V representing the operating state of the compressor 2, to the switching on of the compressor 2 at time t1. An internal operating time counter, represented by the line BSZ which, before t1, was constant with the compressor 2 switched off now begins to increase linearly. The shut-off valve 6, the state of which is represented by a line A, is open since the time point t1 and the ventilator 21, represented by the line F, is switched on.

Due to the operation of the compressor 2, the evaporator 8 cools down, air cooled at the evaporator 8 is conveyed by the fan 21 into the storage chamber 17, and the temperature detected there by the temperature sensor 24 decreases until, at time t2, a lower limit temperature T1 is reached. This leads to the switching off of the compressor 2 (see line V), the closing of the shut-off valve (line A) and the switching off of the fan 21 (line F). The operating time counter BSZ remains at the value reached at time t2.

The temperature in the storage chamber 17 then rises again until, at tune t3, it reaches the upper limit temperature. T3. The control unit 22 again switches the compressor 2 and the fan 21 on and opens the shut-off valve 6. The operating time counter BSZ rises again until at the time point t4, the lower limit temperature T1 is again reached and the compressor 2 and the fan 21 are switched off again and the shut-off valve 6 is closed.

At time t, the upper limit temperature T3 is reached a further time and the compressor 2 is switched on again. Shortly thereafter, at time t6, the operating time counter reaches a limit value $BSZ_{max}$, from which the control unit 22 recognizes that it is necessary to defrost the evaporator 8.

The detection of the operating time count as a criterion for the defrosting requirement has the essential advantage that it can be realized easily and economically. In order to achieve a more precise estimate of the ice quantity on the evaporator 8, it can also be taken into account how much air moisture enters the storage chamber 17, for example, in that opening of the door 15 is detected and the operating time counter BSZ is incremented by a particular amount for each opening of the door or the speed of its rise with the compressor 2 running is made dependent on the number of the door openings that have occurred since the last operating phase of the compressor 2. A direct detection of the thickness of the ice layer on the evaporator 8, for example, by optical means, such as by means of a light barrier, is also conceivable.

Once the control unit 22 has detected, at the time point t6, that defrosting is required, it begins to compare the temperature detected by the temperature sensor 24 with a limit temperature T2 which lies between T3 and T1. In the case under consideration here, TL is above T2 at the time point t6. As soon as T2 is undershot at the time point t7, the control unit 22 closes the shut-off valve 6, whilst the compressor 2 and the fan 21 continue to run for several minutes. The fact that no more refrigerant flows into the evaporator 8 after the time point t7 can lead thereto that, as the line TL shows, the decrease in temperature slows down. However, since at the time point t7 of the closing of the shut-off valve 6, the evaporator 8 contains liquid refrigerant, the temperature TL falls still further after t7.

The time period [t7, t8] between the closing of the shut-off valve 6 and the switching off of the compressor 2 can have a pre-defined length which, taking account of the volume throughput of the compressor 2 and the quantity of liquid refrigerant expected to be contained in the evaporator 8 at the time point t7, is calculated such that it is sufficient in order to draw off at least the majority of this refrigerant from the evaporator 8 in the form of vapor. Therefore, the temperature TL at the time point t8 of the evaporator switch-off can deviate from the limit temperature T1. However, it is also conceivable to select T2 such that the time expected to be needed for cooling from T2 to T1 approximately suffices to evaporate the liquid refrigerant in the evaporator 8 and to sustain the achievement of the limit temperature T1 as a criterion for the switching off of the evaporator 8.

The case can arise that, at the time point t6 at which the operating time counter reaches the limit value $BSZ_{max}$, the) temperature in the storage compartment 17 is already lower than T2. In this event, the control unit 22 could close the shut-off valve 6 simultaneously with the reaching of the limit value $BSZ_{max}$; however, if the compressor 2 is kept in operation long enough substantially to remove the liquid refrigerant in the evaporator 8, the temperature in the storage compartment 17 would fall below T1. This can be prevented in that, in this case, the operating phase of the compressor 2 is ended as normal, i.e. on reaching the temperature T1, the compressor is switched off and until then the shut-off valve 6 remains open and switching over to the comparison with T2 and closing of the shut-off valve on reaching this temperature takes place only in the subsequent operating phase of the compressor 2.

The operating time counter BSZ is reset to zero simultaneously with the switching off of the compressor 8 at the time point t8. If desired, the ventilator 21 can be allowed to run on, if desired, for a further short time, until t9. It is then switched off and the heater 23 is switched on, as shown by a curve H in FIG. 3.

The duration of the period [t9, t10] during which the heater operates can be pre-determined; alternatively, a time point when a rise of the temperature detected by the temperature sensor 25 at the evaporator 8 shows that the evaporator is fully defrosted can be selected as the switching off time point t10 of the heater 23.

The pumping out of the evaporator 8 before defrosting has the result that if, at the time point the temperature TL in the storage chamber 17 has risen again to T3 for the first time since the defrosting so that the compressor 2 must run, the pressure difference between the high pressure region 11 and the low pressure region 12 of the refrigerant circuit 1 is higher than after a normal operating phase of the compressor 8, such as the time periods [t1, t2] or [t3, t4]. Such a high pressure difference can lead to starting difficulties even with a rotation speed-regulated compressor 2 which is efficient enough to start against the pressure difference existing following a normal standstill phase, for example, at the time points t1, t3 or t5. This can be remedied in that, after each defrosting, initially at the time point t11, the shut-off valve 6 is opened (see line A) and then, after a short delay which should not be sufficient to remove the pressure difference entirely between the regions 11, 12, the compressor 2 is started at the time point t12.

| Reference signs | |
|---|---|
| 1 | Refrigerant circuit |
| 2 | Compressor |
| 3 | Outlet |
| 4 | Liquefier |
| 5 | Frame heater |
| 6 | Shut-off valve |
| 7 | Capillary |
| 8 | Evaporator |
| 9 | Outlet |
| 10 | Inlet |
| 11 | High pressure region |
| 12 | Low pressure region |
| 13 | Refrigeration device |
| 14 | Body |
| 15 | Door |
| 16 | Intermediate wall |
| 17 | Storage chamber |
| 18 | Evaporator chamber |
| 19 | Inlet opening |
| 20 | Distribution channel |
| 21 | Fan |
| 22 | Control unit |
| 23 | Heater |
| 24 | Temperature sensor |
| 25 | Temperature sensor |
| TL | Temperature of the storage chamber 17 |
| BSZ | Current value of the operating time counter |
| V | Operating state of the compressor 2 |
| A | Operating state of the shut-off valve 6 |
| F | Operating state of the fan 21 |
| H | Operating state of the heater 23 |

The invention claimed is:

1. A refrigeration device, the refrigerating device comprising:
   a refrigerant circuit which comprises a compressor, an evaporator and a shut-off valve between an outlet of the compressor and an inlet of the evaporator;
   a heater for defrosting the evaporator;
   a control unit, wherein the control unit is configured to prepare for defrosting of the evaporator by operating the compressor with the shut-off valve closed for evaporating liquid refrigerant from the evaporator and drawing the liquid refrigerant away by the compressor; and
   wherein the control unit is configured to operate the shut-off valve to re-open a predetermined time before re-starting the compressor after at least one defrosting period of the evaporator; and
   wherein the compressor is configured to, before or after the at least one defrosting period of the evaporator, switch on at the same time as an opening of the shut-off valve.

2. The refrigeration device as claimed in claim 1, wherein a running time of the compressor between closing of the shut-off valve and switching on the heater is at least 2 minutes.

3. The refrigeration device as claimed in claim 1, wherein a fluid volume conveyed by the compressor between closing of the shut-off valve and switching on of the heater is at least 50 times a fluid volume of the evaporator.

4. The refrigeration device as claimed in claim 1, wherein the control unit is configured to keep the shut-off valve closed throughout operation of the heater.

5. The refrigeration device as claimed in claim 1, wherein the control unit is configured to open the shut-off valve between a switching-off of the heater and a subsequent switching on of the compressor.

6. The refrigeration device as claimed in claim 1, wherein the compressor is configured to start against a pressure difference which exists between a high pressure region and a low pressure region of the refrigerant circuit following a phase of standstill of the compressor during which the heater has not been operated.

7. The refrigeration device as claimed in claim 1, wherein the control unit is connected to a temperature sensor and is configured to switch off the compressor when a first limit value of the temperature detected by the temperature sensor is undershot and to close the shut-off valve before a defrosting of the evaporator if a second limit value of the temperature which lies higher than the first limit value is undershot.

8. The refrigeration device as claimed in claim 1, wherein the evaporator is accommodated in an evaporator chamber which is separate from a storage chamber of the refrigeration device and the control unit is configured to operate a fan which is arranged to circulate air between the storage chamber and the evaporator chamber when the compressor is in operation with the shut-off valve closed.

9. The refrigeration device as claimed in claim 8, wherein the fan is in operation in a time period between the switching off of the compressor and the switching on of the heater.

10. The refrigeration device as claimed in claim 1, wherein a fluid volume conveyed by the compressor between closing of the shut-off valve and switching on of the heater is at least 100 times a fluid volume of the evaporator.

11. The refrigeration device as claimed in claim 1, wherein the heater is configured to operate after the compressor has been switched off for a predetermined amount of time.

12. The refrigeration device as claimed in claim 1, wherein the shut-off valve is configured to reopen before restarting the compressor after each said at least one defrosting period of the evaporator.

13. The refrigeration device as claimed in claim 1, wherein the refrigeration device is a domestic refrigeration device.

14. The refrigeration device as claimed in claim 1, wherein the control unit is connected to a temperature sensor located in a storage chamber,
   wherein during normal operation the control unit is configured to:
   turn on the compressor and open the shut-off valve at the same time when an upper temperature limit is reached;
   turn off the compressor and close the shut-off valve at the same time when a lower temperature limit is reached; and
   to first close the shut-off valve and then after a predetermined time, shut off the compressor during a defrost operation when an intermediate temperature that is between the upper temperature limit and the lower temperature limit is reached.

15. The refrigeration device as claimed in claim 1, wherein the control unit is connected to a temperature sensor located in a storage chamber, wherein the refrigeration device further includes a time counter including a maximum time limit, wherein the time counter is configured to:
   determine an operating time of the compressor,
   compare a temperature of a storage chamber with a limit temperature that is above a lower temperature limit upon the time counter reaching the maximum time limit, and
   close the shut-off valve when the limit temperature is undershot.

16. The refrigeration device as claimed in claim 15, wherein the compressor is configured to run while the shut-off valve is closed to draw off a majority of refrigerant from the evaporator.

17. The refrigeration device as claimed in claim 1, further comprising a fan which is arranged to circulate air between a storage chamber and an evaporator chamber separate from the storage chamber, wherein the control unit is configured to operate the fan when the compressor is on.

18. A method for operating a refrigeration device which comprises a refrigerant circuit with a compressor, an evaporator and a shut-off valve between an outlet of the compressor and an inlet of the evaporator, the method comprising:
   operating the compressor with the shut-off valve closed for evaporating liquid refrigerant from the evaporator and drawing the liquid refrigerant away by the compressor;
   switching off of the compressor;
   heating of the evaporator; and
   re-opening the shut-off valve a predetermined time before re-starting the compressor after at least one defrosting period of the evaporator
   switching on the compressor at the same time as an opening of the shut-off valve before or after the at least one defrosting period of the evaporator.

19. The method as claimed in claim 18, wherein the shut-off valve is re-opened before re-starting the compressor after each said at least one defrosting period of the evaporator.

* * * * *